ERROR CHECKING SYSTEM FOR VARIABLE LENGTH DATA

Filed April 18, 1963 5 Sheets-Sheet 1

INVENTOR.
PAUL R. DAHER
BY Arthur Decker
ATTORNEY

March 28, 1967 P. R. DAHER 3,311,879

ERROR CHECKING SYSTEM FOR VARIABLE LENGTH DATA

Filed April 18, 1963 5 Sheets-Sheet 2

ERROR CHECKING SYSTEM FOR VARIABLE LENGTH DATA

Filed April 18, 1963 5 Sheets-Sheet 3

F-F G4 LOGIC (H1 FALSE)

(G4 = G1⊕G4)

| INPUTS G1 | INPUTS G4 | RESULT G4 |
|---|---|---|
| 0 | 0 | 0 |
| 0 | 1 | 1 |
| 1 | 0 | 1 |
| 1 | 1 | 0 |

$${}_1g_4 = (G_1G_4' + G_1'G_4)H_1'$$

$${}_0g_4 = (G_1G_4 + G_1'G_4')H_1'$$

FIG. 5

F-F F1 LOGIC (W1 TRUE)

(F1 = I1 ⊕ F3⊕F4)

| INPUTS I1 | INPUTS F3 | INPUTS F4 | RESULT F1 |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 1 |

$${}_1f_1 = [I_1(F_3F_4 + F_3'F_4') + I_1'(F_3F_4' + F_3'F_4)]W_1$$

$${}_0f_1 = [I_1(F_3F_4' + F_3'F_4) + I_1'(F_3F_4 + F_3'F_4')]W_1$$

FIG. 4

ERROR CHECKING SYSTEM FOR VARIABLE LENGTH DATA

United States Patent Office 3,311,879

Patented Mar. 28, 1967

3,311,879

ERROR CHECKING SYSTEM FOR VARIABLE LENGTH DATA

Paul R. Daher, San Jose, Calif., assignor to International Business Machines Corporation, New York, N.Y., a corporation of New York Filed Apr. 18, 1963, Ser. No. 274,035

11 Claims. (Cl. 340—146.1)

This invention relates to systems for detection, location and correction of errors in binary coded information conveyed between remote communications stations, and, more particularly, to such systems as applied to serial conveyances, over a communications link, of information words of different word length.

There are presently available a number of well-documented techniques devoted to detection, location and correction of errors in binary coded information which is transmitted serially a bit at a time between remote stations. Such transmission is often over an imperfect communications network: radio telegraphy is subject to atmospheric disturbances, telephony is subject to cross-talk and line noise, gating networks within a data processing computer are subject to spurious oscillations, a computer system involving cooperation between peripheral equipments is subject to intermittent loss of synchronization, etc. Such error handling techniques may be as limited as an odd-even parity check, capable only of detecting an odd or even number of errors, or as potent as burst checking systems capable of correcting a plurality of combinational types of error. In order to provide a background which will serve to distinguish the contribution of the present invention, some of these systems will be reviewed briefly.

The parity check adds, usually, a check bit to the information bits and all bits are transmitted as a train of signals, each signal representing one bit. For example, for an even parity check, the value of the check bit is chosen so that each transmitted data group (i.e., information bits plus the check bit) comprises an even number of binary one bits (i.e., the modulo 2 sum of the bits of the data group is computed). On reception, the parity of the data group is similarly computed; the presence of an odd sum indicates that an odd number of errors has occurred. This system cannot detect an even number of errors, it cannot indicate the location of errors within the data group and it cannot correct them without calling for retransmission.

An advantage of prime significance beyond the above is described in Hamming et al., U.S. Re. 23,601. The system of this patent locates and corrects a single transmission error (SE) in a data group by generating ("encoding") and transmitting a plurality of "locator" parity bits which are a function of the bits in selected bit positions of the data group. The selection sequence for words in which locator parity bits follow information bits in transmission, resembles a binary counting sequence and the function is, as with the parity check, the modulo 2 sum. In operation, if a parity check ("decoding") produces a count of 0 for each selection of bits, no error was made, but if the result is otherwise, a combined count comprising all selection counts will indicate the bit position of the data group occupied by the bit in error. The patent also teaches the detection of a double error (DE) by adding another "error-type" parity bit which checks all bit positions of the data group.

Both SE correction and DE detection are also characteristic of systems conceived by Abramson and described in U.S. 3,114,130 and 3,163,848. Abramson has realized that this result could be achieved by selection of bit positions in accordance with a shift sequence and that a considerable practical advantage thereof is that mechanization of the parity check selections may be by a shift register. Abramson further has realized that, in order to avoid ambiguity in error location and to provide optimum error checking, the shift sequence should be of maximum length, i.e., an "*m* sequence," which may be generated by a shift register having "exclusive OR" (i.e., modulo 2 adder) feedback connections from certain of its stages. Since more than one *m* sequence may be generated by registers having at least three stages and this type of feedback connection, Abramson points out that it is immaterial which sequence is generated by the shift register provided that both the encoder at the transmitting station and the decoder at the receiving station generate the same one. Abramson goes still further and shows double adjacent error (DAE) correction as well as SE correction, by utilizing generators of both an *m* sequence and its inverse (*m'* sequence), one in the encoder and the other in the decoder.

In U.S. 3,213,426, Melas extends this approach to correcting errors in other combinations of bits in a data group and demonstrates by applying his system to double non-adjacent errors (DA'E) and triple adjacent errors (TAE). This is done by adding an additional locator parity bit and an additional error-type parity bit. Both the locator and error-type bits are chosen by generators making *m* sequence selections of bit positions of the data group and thus two *m* sequence generators in the encoder and in the decoder are required.

It is, of course, known that many other codes may be derived to accomplish the objects of error detection, location and correction. The basis for the high regard attached to maximum length shift sequences is the simplicity of the circuitry with which they may be coded and decoded, namely, with shift registers incorporating one or more modulo 2 or complemented modulo 2 feedback connections, i.e., exclusive "OR" connections.

However, of the art examined by applicant, none has attacked the problem of transmission fidelity through error correction, in a system involving serial-by-bit, serial-by-word transmission of digital information in which different computer word lengths are contemplated. Such systems are found in various electronic high speed computers, for which one of the intents of design is to speed operation by avoiding filling in irrelevant information in order to conform to a fixed word length, to economize on equipment by eliminating, for instance, a word counter, and to simplify programming by allowing the operator to keep track of only information meaningful to his program.

The present invention is exemplified by a system capable of detecting that, in a data group, a bit is affected by error, of locating the bit in error and of correcting the bit by generating its correct counterpart and substituting the latter for the former, these being accomplished in an environment in which the word length may differ from word to word. The invention contemplates the transmission of complete multi-bit data groups, comprising, in the embodiment selected for particular description, for instance, a series of bits which represent information (the computer word) followed by a series of bits devoted to error checking. The check bits are derived by modulo 2 additions of information bits selected in accordance with a cyclic code, as is known for messages consisting of words each having the same number of information bits, and operates to permit transmission of data groups of various lengths equal to or less than the maximum number of different bit combinations contained in the cyclic code, and, further, in reception, generates a correction signal as soon as the last significant bit of the data group is sensed. As a result, the system of the present invention does not require "filling in" a short word to a standard length with insignificant digits (i.e., zeros) nor extending the time required for correcting errors because the generation of the correction signal does not coincide with the sensing of the error.

It should therefore be apparent that it is an objct of this invention to provide a system for the detection, location and correction of errors of various types commonly affecting binary coded information serially conveyed between remote communications stations as data groups in a plurality of lengths.

It is another object to accomplish the above with error check coding which does not change the information but, preferably, simply adds to the information bit train a sequence of check bits for use in error diagnosis.

It is a further object of this invention to accomplish the above automatically such that operating personnel of the communications network need not be concerned with attending to this function.

It is a still further object of the invention to accomplish the foregoing with circuitry which is simple, inexpensive, economical of computer time and reliable over extended periods of operation.

Another object of the invention is error detection, location and correction in binary coded information arranged in any of the word formats common in modern computer technology.

The foregoing and other objects, features and advantages of the invention will be apparent from the following more particular description of a preferred embodiment of the invention, as illustrated in the accompanying drawings.

FIGURES 4 and 5 are tables from which the Boolean equations governing encoder and decoder register operation may be derived, the equations representing the triggering of a flip-flop being given below its table;

Figure 8:
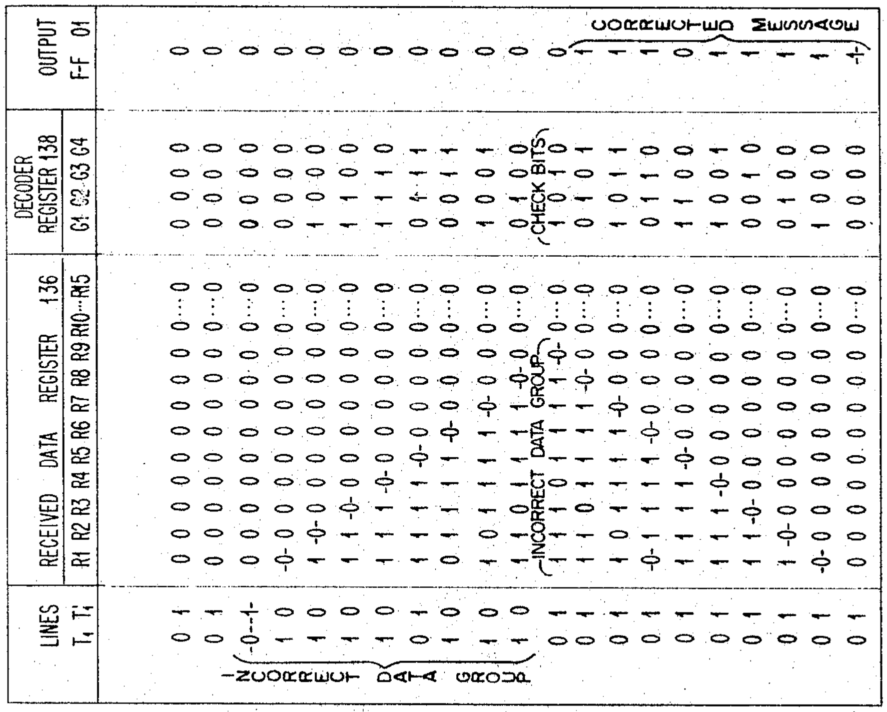
Figure 7:
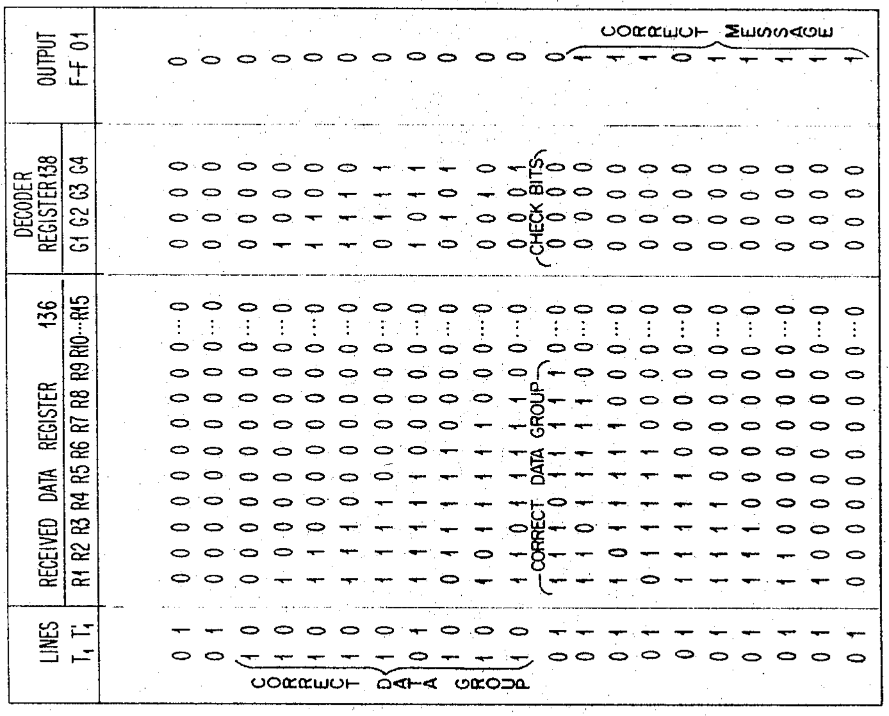

FIGURES 7 and 8 present, compositely, examples of the operation of the decoder of the invention for which information is transmitted correctly and incorrectly, respectively.

The present invention contemplates the integration of the aforementioned error detection and correction technique into a computer system capable of storing numbers are combinations of "true " and "false" states in a set of bi-stable state circuits such as flip-flops, as bi-state magnetic recordings on a magnetizable surface, or as some other well known form of binary representation, and involves the sequential operation of computer structure including pulse sources, AND gates, OR gates, etc. Very generally, the system of the present invention may be regarded as comprised of flip-flops, a source of clock signals for synchronization, and "logical" networks capable of controlling the operation of the combination of components to be described. It is therefore appropriate, before going into a description of the details of the circuitry of the invention as applied to specific examples, to describe the convention employed herein for nomenclature.

The circuits of the invention are used to perform logical operations (AND, OR, etc.) and are represented in the form of equations shown in Boolean notation. The terms of the equations are mechanized in circuitry by output signals from flip-flops, which are electronic devices having two possible steady state conditions. One of these conditions is referred to as "true" and the other condition is referred to as "false"; when a flip-flop is described as being true, it will be understood to be storing a binary digit one (bit 1), and when it is described as false, it will be understood to be storing a binary digit zero (bit 0).

The flip-flops are characterized by two inputs, only one of which may be impressed with an actuating signal at a time, and two outputs having complementary signals. Input signals to the flip-flop are supplied by gates which are part of logical networks and output signals from the flip-flop are supplied to similar gates. It is the operation of these gates that are described by means of the Boolean equations, each of which thus defines the triggering of a flip-flop. The terms of an equation corresponds to flip-flop output signals and the equation represents the activation of gates and, consequently, the generation of flip-flop input signals during bit periods, i.e., equal time intervals established by a "clock" signal, flip-flop triggering actually occurring at the end of the bit period, so that the flip-flops are in the desired states during the next bit period.

The nomenclature used for the present invention employs combinations of letters and numbers for designating the terms of the equations. The flip-flops themselves are designated by combinations of capital letters and numbers: thus, flip-flops F1, G3, etc. One output signal of the flip-flop is characterized by a corresponding capital letter with the associated number shown in a subscript: thus, signals $F_1$, $G_3$, etc. In order to distinguish the complementary output of the flip-flop, it is accompanied by an affixed prime: thus, signals $F_1'$, $G_3'$, etc. It will be understood that, in circuitry, the output signals usually comprise a pair of voltage levels, one high and one low, on a line, and, when the unprimed signal output of a flip-flop is high in voltage and the primed signal output is low in voltage, the flip-flop is true, while, for the reverse condition, the flip-flop is false: thus, flip-flop F1 is true when signal $F_1$ is at the high voltage level and signal $F_1'$ is at the low voltage level.

On the other hand, the signals to the flip-flops are designated by corresponding lower case letters with the associated number shown as a subscript. The input signal for rendering the flip-flop true is designated by a subscript 1 prefixing the lower case letter: thus, signals ${}_1f_1$, ${}_1g_3$, etc. The input signal for rendering the flip-flop false is designated by a subscript 0 prefixing the lower case letter: thus, signals ${}_0f_1$, ${}_0g_3$, etc. These signals take the form of sharp pulses occurring at the trailing edge of a clock signal, i.e., at the end of a bit period.

Although the inventive concept is quite applicable to other systems of representing information in a computer, it will be presented herein with regard to a synchronized pulse system. By this is meant a system in which repetitive pulses, whether information representing, or clock signals, or otherwise, are synchronized to occur at particular time intervals with reference to each other. In such a system, signals may be of square wave shape alternating between the aforementioned voltage levels; and it is most convenient to regard synchronization as being provided by clock signals of symmetrical square wave shape generated by a pulse generator, which may comprise a repetitive magnetic recording associated with a sensing electromagnetic transducer and pulse shaping circuitry, or a frequency controlled square wave generator, or other appropriate means. Synchronization by such means implies that the potential of a line may change between the voltage levels only at the time of the trailing edge of the clock signal pulse, the time between trailing edges being designated as a bit period.

The invention provides error detection, location and correction in a communications system environment, which includes a transmitting station and a receiving station, both operating in sequential steps as follows.

In the transmitting station encoder, an input flip-flop is set up to correspond, in sequence, to the information bits of a word being received from a computer memory or some other source and then is reset to the false state.

Coincident with the receipt of the first information bit by the input flip-flop, a word flip-flop is set true by a "start-of-word" pulse generated at the memory and, after the receipt of the last bit, is set false by an "end-of-word" pulse also generated at the memory; the word flip-flop thus indicates the serial storage of information bits in the input flip-flop. An encoder register, having as many stages as required to provide error correction coding for a predetermined maximum number of information bits and on the desired breadth of the particular application of the system (i.e., whether correction is to be SE, DAE, etc., as defined previously), is arranged by internal feedback connections to sequence in response to the output of the input flip-flop. The internal feedback connections of the encoder register are made through one or more exclusive OR gates, arranged, preferably, to provide operation in accordance with an *m* sequence, and thus, after all information bits have been sensed, the encoder register stores check bits which represent the modulo 2 sum of the selected bit values set up in the input flip-flop; subsequently, the encoder register operates for as many additional bit periods as it comprises stages, the bit period count being made in an encoder counter started in response to the false state of the word flip-flop. A transmitted data flip-flop "follows" the state of the input flip-flop (the information bits), then is set up to correspond with the modulo 2 sum of selected stages of the encoder register (i.e., set up with encoder check bits). The outputs of the transmitted data flip-flop are conveyed to the transmission link which thus carries, in order, the information bits and the encoder check bits (comprising a data group) to the receiving station. The receiving station also receives, on other lines, an output of the encoder counter which is generated to indicate the end of the data group and the start-of-word pulse from the memory.

In the receiving station decoder, a received data register having a number of flip-flop stages equal to the maximum number of bits in a data group, is set up to correspond to the outputs of the transmitted data flip-flop, the presence of the data group being identified by the states of a pair of timing flip-flops (a data group flip-flop and a delay flip-flop) responsive to the start-of-word signal and the end-of-data-group signal. Simultaneously, a decoder register, having an arrangement of internal connections identical to the encoder register of the transmitting station, responds sequentially to the bits of the data group, thereby sensing the sequential bit values set up in the transmitted data flip-flop as well as selected stages of the decoder register itself. The data group is shifted out of the received data register and, if the decoder register is in a reset state, it is shifted into an output flip-flop; but if the decoder register is not in a reset state, its state, presuming an SE system, will identify the bit affected by error, and, as the incorrect bit is shifted out of the received data register, a unique state of the decoder register will cause it to be complemented. The output flip-flop sequentially transfers the correct data group (now designated a message) back to the computer memory or to readout equipment or otherwise.

Figure 1:
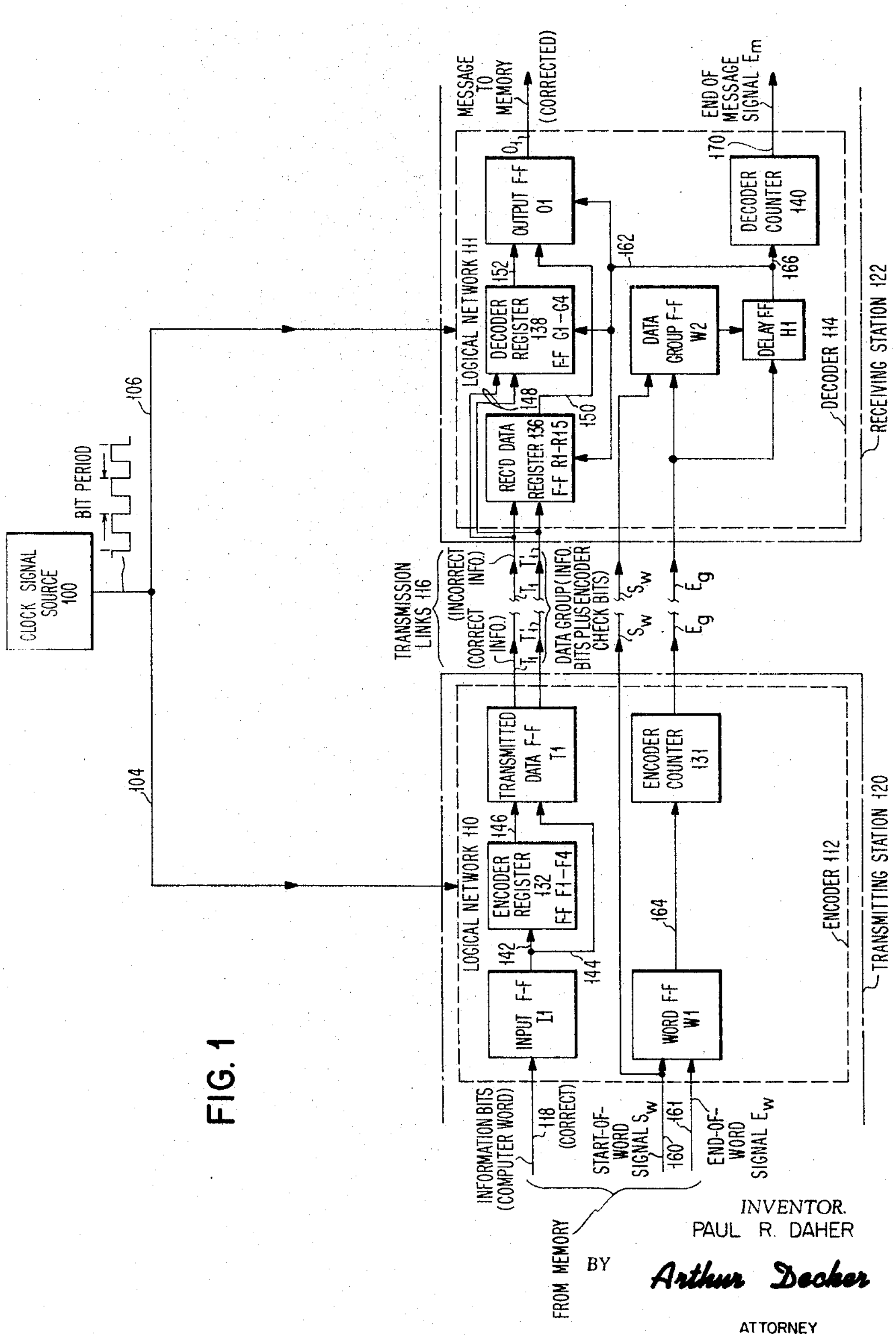
FIGURE 1 is a block diagram of an information handling system comprising a preferred embodiment of the invention.

Referring now to FIGURE 1, it is seen that the preferred illustrative information handling system comprises equipment in transmitting station 120 and receiving station 122, a clocking system being employed for synchronization. Logical networks 110 and 111, included in encoder 112 of transmitting station 120 and decoder 114 of receiving station 122, respectively, are operative to cooperate with various flip-flops and registers, as shown, together with equipment to provide for entering information into, removing information from, and sequencing the operation of, this combination.

The aforementioned bit periods are established by clock signal source 100 which emits symmetrical square wave signal on lines 104 and 106; these lines provide the clock signal input to logical networks 110 and 111, respectively. For simplicity, synchronism between transmitting station 120 and receiving station 122 by means of a single clocking system is illustrated, although it is to be understood that asynchronous operation may be preferred, for instance, where the stations are located in separate equipments such as a computer and a magnetic tape unit, which characteristically operate at different speeds.

Logical networks 110 and 111 include the gates and associated circuitry controlling the operation of the flip-flops and registers of the system and thus serve to route information in a manner appropraite to perform the desired error detection, location and correction; these networks are connected to each other by transmission links 116 comprising output lines $T_1$ and $T_1'$ of transmitted data flip-flop T1 which carry the data group and control lines $S_w$ and $E_g$, which indicate the first and last bit periods, respectively, that the data group is present on lines $T_1$ and $T_1'$.

The information bits (i.e., the computer word) are sequentially received by encoder 112 in transmitting station 120 on line 118, presumably correct as recorded in the computer memory, and are set up by logical network 110 in input flip-flop I1; input flip-flop I1 is then reset (i.e., to zero). Both encoder register 132 and transmitted data flip-flop T1 are caused by logical network 110 to respond to the sequential outputs of input flip-flop I1, the former by way of line 142, while it sequences to compute the encoder check bits, and the latter, by way of line 144, to set up lines $T_1$ and $T_1'$ with the information bits. Subsequently, flip-flop T1 responds to encoder register 132 via line 146 to receive the encoder check bits. The transmitted data group which appears on lines $T_1$ and $T_1'$ of transmission links 116 thus comprises, in sequence, the information bits and the encoder check bits. To indicate the start and end of the information bit train on line 118, a start-of-word signal $S_w$, on line 160, is at the high potential level only during the bit period prior to that of the first information bit, and an end-of-word signal $E_w$, on line 161, is at the high potential level coincident with the last information bit; signals $S_w$ and $E_w$ may be generated at the memory as outputs of flip-flops (not shown) or otherwise, and operate to trigger word flip-flop W1 accordingly; word flip-flop W1 thus indicates the presence of information bits in input flip-flop I1; signal $S_w$ is also provided to receiving station 122 on line $S_w$ to trigger data group flip-flop W2 true, for reasons which will be given below. The number of encoder check bits generated corresponds to the number of stages in encoder register 132 (four, flip-flops F1 through F4, in the exemplary system) and are counted by encoder counter 131 comprising, here, a binary counter. Word flip-flop W1, via line 164 starts encoder counter 131 which is reset to zero after making four counts. To indicate the end of the data group, the last count of encoder counter 131, designated as signal $E_g$, connects to receiving station 122 through transmission links 116. Thus, receiving station 122 receives the clock signal on line 106 and, through transmission links 116 the following: the data group on lines $T_1$ and $T_1'$ from flip-flop T1, start-of-word signal $S_w$, on its corresponding line from the memory, and end-of-data group signal $E_g$ on its corresponding line from encoder counter 131.

In receiving station 122, logical network 111 of decoder 114 causes the entire data group to be serially shifted into received data register 136, which has a number of stages sufficient to store a data group of maximum length (here, 15 stages, flip-flops R1 through R15) by connecting lines $T_1$ and $T_1'$ to flip-flop R1 thereof; it is stored there pending the outcome of error checks by decoder register 138, which is also responsive, via lines 148, to the entire data group. Decoder register 138 includes the flip-flops (here, four flip-flops G1 through G4, flip-flop G1 being connected to line $T_1$), and exclusive OR connections similar to encoder register 132, and sequences to compute four decoder check bits. When the decoder check bits are computed, the data group is shifted into output flip-flop O1 from received data register 136 over line 150, and thence, on line $O_1$, back to the memory or to some other utilization device.

As already pointed out, it is herein presumed that transmission link 116 is imperfect, i.e. affected by atmospheric disturbances, or some other effect which may cause the data group to be received on lines $T_1$ and $T_1'$ of receiving station 122 characterized by errors in one or more bits. If the four decoder check bits computed by decoder 114 are all zero, it is an indication that no errors occurred in transmission. However, if the decoder check bits are otherwise, their combined state, in this exemplary system, is an indication of the bit in error, which, since the exemplary system is a binary one, must be complemented prior to being set up in output flip-flop O1; this complementation is signalled by decoder register 138 via line 152. Since the memory must recognize the presence of the message on line $O_1$, control signals $W_2'$, on line 154 from data group flip-flop W2, and $E_m$, on line 170 from decoder counter 140, are provided to indicate the start and end, of the message. Delay flip-flop H1, responsive to flip-flop W2, provides a one bit-period delay for synchronization of operation of various of the other components of decoder 114, such as decoder counter 140 via line 166, and received data register 136, output flip-flop O1 and decoder register 138 via line 162.

Figures 2, 3:
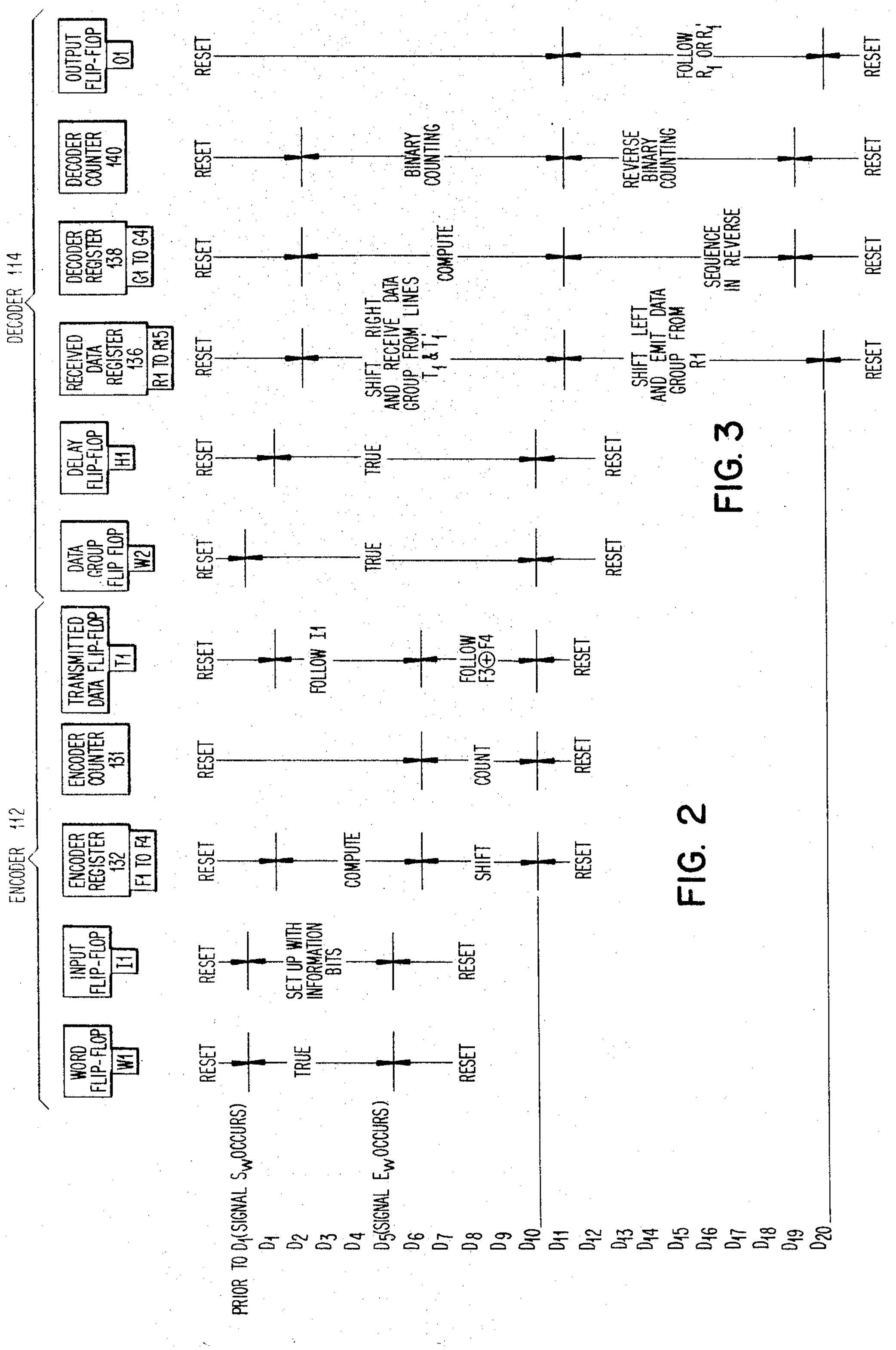
FIGURES 2 and 3 are sequential bit period diagrams, presented compositely, of the operation of the encoder and decoder of the invention.

The aforementioned activity of encoder 112 of the present system is detailed in FIGURE 2 with regard to sequential bit periods $D_1$, $D_2$ . . . which, as is known, may be generated by a counter (not shown); consequently, FIGURE 2 may be considered to comprise a presentation of the "flow diagram" of the operation of encoder 112, for an embodiment contemplating a 5-bit computer word and an 11-bit maximum word length. In figure, the flip-flops of encoder 112 are enumerated in the columns and their activity for each bit period is summarized. It is to be noted that the bit periods are numbered for convenience in following the system timing only since it should be obvious that a different number of bit periods would be involved for a different computer word length.

As indicated, prior to period $D_1$, logical network 110 (FIGURE 1) senses start-of-word signal $S_w$ on line 160; it arranges for word flip-flop W1 to be set true and for the first incoming bit of the word to be set up in input flip-flop I1 during period $D_1$. It is to be noted that, prior to period $D_1$, all the flip-flops of the system are set false in preparation for activity during subsequent bit periods. Techniques for this operation are well known and are not considered as inherent in the system of the invention; therefore logical equations and networks corresponding thereto will not be shown or described here. Thus, at the fall of the clock signal terminating period $D_1$, flip-flop I1 is storing the first bit of the incoming word, flip-flop W1 is true, and the flip-flops of encoder register 132 and encoder counter 131 and transmitted data flip-flop T1 are false. Flip-flop I1 continues to receive information bits through period $D_5$ (five sequential bits of the word), when it is reset. During periods $D_{2-6}$, portions of logical network 110 set up encoder register 132 to sequence as a shift register of maximum length and compute check bits related to the information bits stored in flip-flop I1 during periods $D_{1-5}$. Simultaneously, flip-flop T1 also responds to the content of flip-flop I1 and thus emits the five information bits of the word on lines $T_1$ and $T_1'$. Encoder register 132 has completed its computation by the end of period $D_6$ and also at this time flip-flop W1 is false, having been so set by end-of-word signal $E_w$ which occurred on line 161 during period $D_5$; during periods $D_{7-10}$, flip-flop T1 is set up with the exclusive OR sum of flip-flops F3 and F4 of encoder register 131, which makes four right shifts, counted by encoder counter 131. With regard to transmission links 116 during period $D_{10}$, the last encoder check bit is on lines $T_1$ and $T_1'$ and line $E_g$, which is an output of encoder counter 131 indicative of the presence of the last bit of the data group in flip-flop T1, is at the high potential, signifying to receiving station 122 that, for the word just received by transmitting station 120 from the memory, this period ends the data group generated by encoder 112. At the end of period $D_{10}$, all five information bits and the encoder check bits (i.e., the data group) have been emitted on lines $T_1$ and $T_1'$ and all flip-flops are reset.

The method by which encoder 112 generates its check bits will be explained by reference to FIGURE 4, comprising a truth table depicting the triggering requirements for flip-flop F1 and in accordance with which logical network 110 operates. Logical network 110 is energized to provide this logic during bit periods identified by the states of flip-flop W1, as indicated, as defined by the characteristic equation shown for flip-flop F1. Thus, the characteristic equation $$F1 = I1 \oplus F3 \oplus F4$$

signifies that the state of flip-flop F1 during a bit period will be defined by exclusive OR connections of the outputs of flip-flops I1, F3 and F4 during the next prior bit period; i.e., that flip-flop F1 will trigger true if the modulo 2 sum of the states of flip-flops I1, F3 and F4 is 1 but will trigger false if the modulo 2 sum of the states of these flip-flops is 0. The truth table tabulation of all combinations of states of flip-flops I1, F3 and F4 specifies those combinations resulting in true and false states in flip-flop F1. The above characteristic equation is to be distinguished from the trigger equations for flip-flop F1 which are given below the truth table and specify the trigger conditions representative of the input gates formed in logical network 110 required to set flip-flop F1 true (the ${}_1f_1$ equation) and the triggering conditions required to set flip-flop F1 false (the ${}_0f_1$ equation). The first term of the ${}_1f_1$ equation, for instance, specifies that flip-flop F1 will be set true at the fall of a clock signal terminating any of the bit periods during which flip-flop W1 is true (in the example, periods $D_{1-5}$) if outputs $I_1$ (of flip-flop I1), $F_3$ (of flip-flop F3) and $F_4$ (of flip-flop F4) are simultaneously at the high voltage level, or if outputs $I_1$, $F_3'$ and $F_4'$ are simultaneously at the high voltage level; these combinations provide a modulo 2 sum of 1 and the terms of the ${}_0f_1$ equation provide a modulo 2 sum of 0. When the triggering equations are therefore regarded, it will be seen that they state the flip-flop F1 characteristic equation in the form of inclusive OR and AND gates, in which form they may readily be mechanized by well known computer hardware, such as diode-resistor circuitry, saturable magnetic cores, etc.

Returning now to FIGURE 2, it is seen that no computation result is entered into flip-flop F1 during the periods for which flip-flop W1 is false (in the example, periods $D_{6-10}$) and a shift characterizes flip-flops F2 to F4 throughout the operation of encoder 112. The false state in flip-flop F1 is provided by the triggering equation $${}_0f_1 = W_1'$$

which takes effect at the end of period $D_6$ in the example. Thus, the complete triggering equations for flip-flop F1 are:

$${}_1f_1 = [I_1(F_3F_4 + F_3'F_4') + I_1'(F_3F_4' + F_3'F_4)]W_1$$
$${}_0f_1 = [I_1(F_3F_4' + F_3'F_4) + I_1'(F_3F_4 + F_3'F_4')]W_1 + W_1'$$

The shift is provided by arranging for flip-flops F2 to F4 to follow flip-flops F1 to F3, respectively, in accordance with the following equations:

$${}_1f_2 = F_1 \qquad {}_1f_3 = F_2 \qquad {}_1f_4 = F_3$$
$${}_0f_2 = F_1' \qquad {}_0f_3 = F_2' \qquad {}_0f_4 = F_3'$$

and, since this activity manifests for flip-flops F2 to F4 throughout the operation of encoder 112, timing by means of terms representing outputs of flip-flop W1 need not be included in these equations. Counter 131 indicates the periods during which the encoder check bits appear in flip-flop T1 (here, periods $D_{7-10}$) and, for this purpose, is started in its four-count sequence by the false state of flip-flop W1. Such counters capable of binary counting in either direction are well known in the computer arts and need not be discussed further.

During periods $D_{1-5}$ (flip-flop W1 is true), flip-flop T1 follows flip-flop I1. Since the latter receives the computer word from the memory during periods prior to period $D_6$, after which it is set false, lines $T_1$ and $T_1'$ are sequentially set up with the information bits throughout periods $D_{2-6}$:

$$_1t_1=I_1W_1$$
$$_0t_1=I_1'W_1$$

At the end of period $D_6$ (flip-flop W1 is false), flip-flop T1 is triggered to follow the modulo 2 sum of the content of flip-flops F3 and F4:

$$_1t_1=(F_3F_4'+F_3'F_4)W_1'$$
$$_0t_1=(F_3F_4+F_3'F_4')W_1'$$

and thus the encoder check bits are generated and appear on lines $T_1$ and $T_1'$ during periods $D_{7-10}$. The composite trigger equations for flip-flop T1 are thus the enclusive OR sums:

$$_1t_1=I_1W_1+(F_3F_4'+F_3'F_4)W_1'$$
$$_0t_1=I_1'W_1+(F_3F_4+F_3'F_4')W_1'$$

It should be noted that the encoder check bits as emitted from transmitting station 120 are not identical to those which appear in encoder register 132 after the computer word is sensed (here, during period $D_6$). The former are derived by essentially the same logic, except, of course, that the initial content of encoder register 132 is the latter and the outputs of flip-flop I1 are excluded, an arrangement which makes possible the setting up in flip-flop T1 of the encoder check bits immediately following the information bits, whereas, if the latter were employed, a spurious (zero) bit would appear in flip-flop T1 between the last information bit and the first check bit, unless special provision is made in the logic to avoid this.

FIGURE 3 comprises a flow diagram depicting the operation of decoder 114 of receiving station 122; in the ensuing discussion of this figure, as well as the other figures presented, it is presumed that there is no transmission delay in transmission links 116.

As indicated, prior to period $D_1$, logical network 111 responds to start pulse $S_w$ to ready decoder 114 by setting data group flip-flop W2 true:

$$_1w_2=S_w$$

which, in turn, sets delay flip-flop H1 true at the end of period $D_1$:

$$_1h_1=W_2$$

The one bit period delay thus introduced is used to synchronize the response of received data register 136 and decoder register 138 to the data group on lines $T_1$ and $T_1'$, as will be shown. Both flip-flops W2 and H1 are reset when the entire data group has been transmitted; this reset is via signal $E_g$, which, it will be recalled in connection with FIGURE 2, is the output of encoder counter 131 which signifies the occurrence of the last bit of the data group on lines $T_1$ and $T_1'$:

$$_0w_2=E_g \qquad _0h_1=E_g$$

In response to the true state of flip-flop H1, received data register 136 operates as a right-shift register, bits being entered into flip-flop R1 from lines $T_1$ and $T_1'$:

$$_1r_1=H_1T_1$$
$$_0r_1=H_1T_1'$$
$$_1r_2=H_1R_1$$
$$_0r_2=H_1R_2'$$
$$\vdots$$
$$_1r_{15}=H_1R_{14}$$
$$_0r_{15}=H_1R_{14}'$$

Thus, by the end of period $D_{11}$ (for this example), the data group is stored in the left-most stages (flip-flops R1 through R9) of received data register 136.

The method by which decoder 114 utilizes the received data group to identify, locate and correct an error may be understood when it is noted that the sequencing of the flip-flops of decoder register 138 in response to the true state of flip-flop H1 and the data group on line $T_1$ may be represented by the same truth table as presented in FIGURE 4 except, of course, that the column designations must be changed to conform to the equipment provided in decorder 114. The corresponding characteristic equations are:

$$G1=T1\oplus G3\oplus G4$$
$$G2=G1$$
$$G3=G2$$
$$G4=G3$$

from which the following triggering equations may be derived:

$$_1g_1=H_1[T_1(G_3G_4+G_3'G_4')+T_1'(G_3G_4'+G_3'G_4)]$$
$$_0g_1=H_1[T_1(G_3G_4'+G_3'G_4)+T_1'(G_3G_4+G_3'G_4')]$$
$$_1g_2=H_1G_1 \quad _1g_3=H_1G_2 \quad _1g_4=H_1G_3$$
$$_0g_2=H_1G_1' \quad _0g_3=H_1G_2' \quad _0g_4=H_1G_3'$$

As a result, during period $D_{11}$ (after the data group has been sensed), decoder register 138 contains a set of check bits which are zeros if there has been no transmission error but otherwise are a combination unique to the bit position of the data group containing a bit in error.

Decoder counter 140 is started in a binary counting sequence by the true state of flip-flop H1; further discussion of decoder counter 140 will not be given here for the same reason as given in connection with encoder counter 131.

Thus, during the first bit period in which flip-flop H1 is false, received data register 136 contains the data group in its left-most flip-flops, decoder register 138 is reset if no transmission error had occurred or contains a content indicating a bit in error, and decoder counter 140 has reached a count corresponding to the number of bits in the data group (i.e., a maximum count with regard to the data group length).

The shift in received data register 136 is now reversed; the data group appears sequentially in flip-flop R1 and the register is reset through flip-flop R15:

$$_1r_1=H_1'R_2$$
$$_0r_1=H_1'R_2'$$
$$_1r_2=H_1'R_3$$
$$_0r_2=H_1'R_3'$$
$$\vdots$$
$$_0r_{15}=H_1'$$

The false state in flip-flop H1 also controls encoder register 138 to sequence in reverse (i.e., generate an *m'* sequence) in accordance with the characteristic equations:

$$G1=G2 \quad G2=G3 \quad G3=G2 \quad G4=G1\oplus G4$$

for which the corresponding triggering equations are:

$$_1g_1=H_1'G_2 \quad _1g_2=H_1'G_3 \quad _1g_3=H_1'G_4$$
$$_0g_1=H_1'G_2' \quad _0g_2=H_1'G_3' \quad _0g_3=H_1'G_4'$$
$$_1g_4=H_1'(G_1G_4'+G_1'G_4)(G_1'+G_2+G_3+G_4)$$
$$_0g_4=H_1'[G_1G_4+G_1'G_4')+(G_1G_2'G_3'G_4')]$$

as represented for flip-flop G4 in the truth table of FIGURE 5. The term $(G_1'+G_2+G_3+G_4)$ of the $_1g_4$ triggering equation for flip-flop G4 will be recognized as the logical complement of the term $(G_1G_2'G_3'G_4')$ of the $_0g_4$ triggering equation, which, if at the high voltage level when flip-flop H1 is false, indicates, in the exemplary system, that the bit next to be emitted by received data register 136 is in error and needs to be complemented and that decoder register 138 is subsequently to be in a reset condition.

Decoder counter 140 is also controlled by the false state in flip-flop H1 to reverse its counting sequence until it is cleared. It is during this reverse counting sequence that output flip-flop O1 receives the data group, corrected if necessary, for retransmission as a message to the memory over line $O_1$ (FIGURE 1):

$$_1o_1=H_1'[R_1(G_1'+G_2+G_3+G_4)+R_1'(G_1G_2'G_3'G_4')]$$
$$_0o_1=H_1'[R_1(G_1G_2'G_3'G_4')+R_1'(G_1'+G_2+G_3+G_4)]$$

The aforementioned complementation of a bit in error is effected by the $G_1G_2'G_3'G_4'$ term of the above equations, the level of which, coincident with the false state of flip-flop H1, causes flip-flop O1 to selectively respond to the two outputs of flip-flop R1 of received data register 136.

It may also be pointed out that the reset condition of decoder counter 140 (here, during period $D_{20}$) provides an end-of-message signal $E_m$, on line 170, which may be routed through the system to reset all flip-flops and registers and to the memory to indicate that the system is prepared to receive the next computer word.

Figure 6:
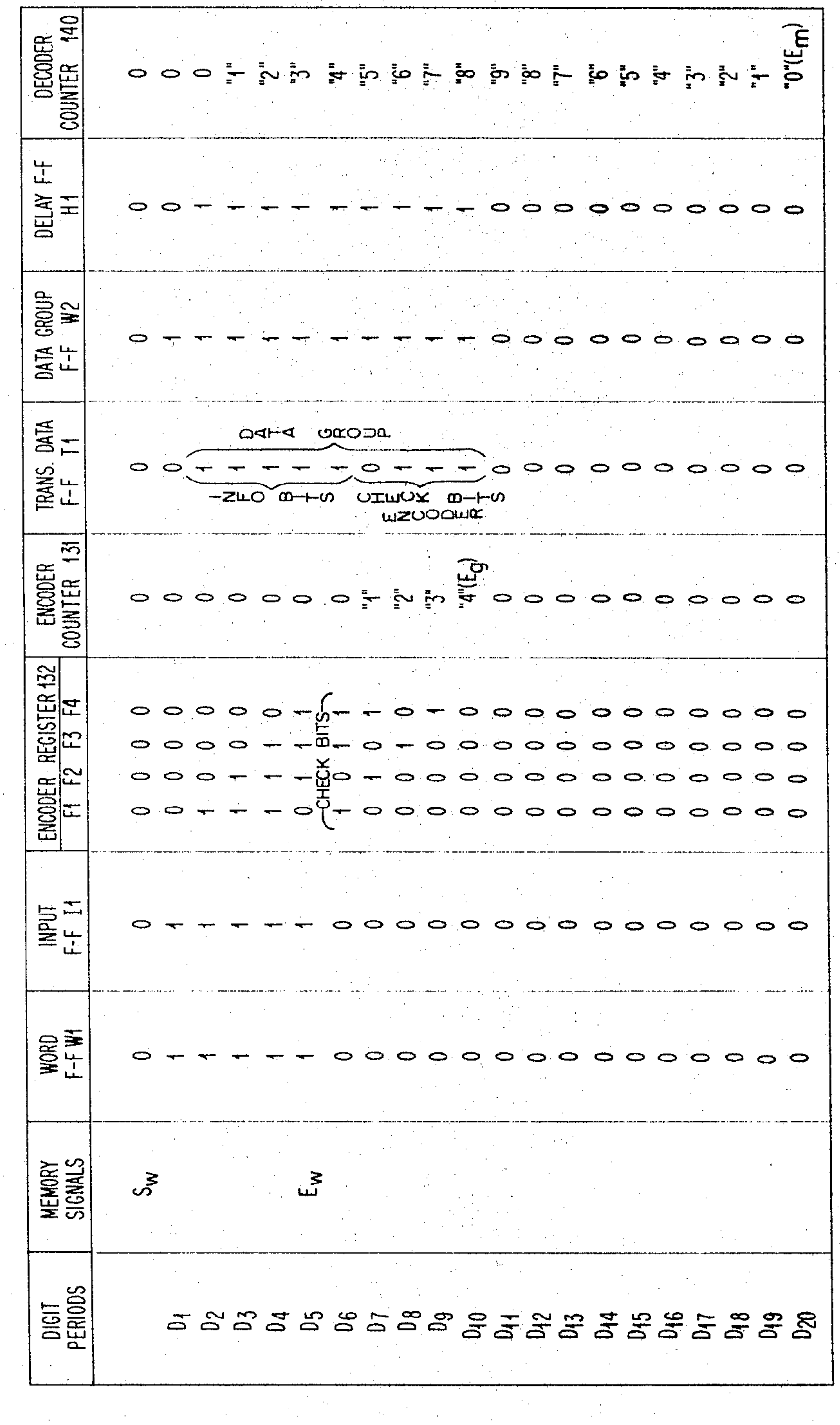
FIGURE 6 represents the operation of equipment in the encoder and decoder for the examples of FIGURES 7 and 8.

FIGURES 6, 7 and 8 provide examples of the operation of the invention, and involve the transmission of the five bit computer word 11111 in a system capable of handling an 11 bit computer word, in which 20 digit periods $D_{1-20}$ are involved.

FIGURE 6 concerns equipment in encoder 112 and decoder 114 and complies with the flow diagram of FIGURE 2 as follows. Prior to period $D_1$, start-of-word signal $S_w$ occurs on line 160 from the memory (FIGURE 1) and sets word flip-flop W1 true during period $D_1$; simultaneously, the first information bit is set up in input flip-flop I1. Flip-flop I1 continues to respond to the bits of the word as long as flip-flop W1 is true; this is until period $D_5$ when end-of-word signal $E_w$ is received from the memory on line 161. Transmitted data flip-flop T1 follows flip-flop I1 until period $D_6$ and the word appears in transmission links 116 accordingly. In the meanwhile (period $D_{2-6}$), encoder register 132 responds to flip-flop I1 and computes its check bits, 1011, which are set up therein during period $D_6$. Subsequently, encoder counter 131 is triggered by the false state in flip-flop W1 and makes four counts, represented as "1" "2" "3" "4," during periods $D_{7-10}$, the last of which, designated as end-of-data-group signal $E_g$, is transmitted to receiving station 122 (FIGURE 1). During the four counts, encoder register 132 shifts right and flip-flop T1 is triggered in accordance with the modulo 2 sum of the states of flip-flops F3 and F4 of this register, to thereby emit the encoder check bits 0111. The transmitted data group thus comprises the bit train 11111 0111, emitted by encoder 112 during periods $D_{2-10}$.

In decoder 114, prior to period $D_1$, data group flip-flop W2 is set true by start-of-word signal $S_w$ and at the end of period $D_{10}$, is set false by signal $E_g$ generated by encoder counter 131. Delay flip-flop H1 follows flip-flop W2 throughout period $D_9$ and is also set false by signal $E_g$ at period $D_{10}$. Thus, the simultaneous true states of flip-flops W2 and H1 identify periods $D_{2-10}$, when the data group is being received on lines $T_1$ and $T_1'$. Decoder counter 140 is started to count at period $D_2$ in response to the first true state of flip-flop H1.

FIGURE 7 concerns the activity of decoder 114 under the presumption that the data group is received by receiving station 122 exactly as transmitted. During periods $D_{2-10}$, flip-flop R1 of received data register 136 follows lines $T_1$ and $T_1'$ to be sequentially set up with the data group, and received data register 136 shifts so that, during period $D_{11}$, the data group is stored in flip-flops R1 through R9. Decoder counter 140 has counted to "9" by period $D_{11}$ (FIGURE 6). The true state of flip-flop H1 has also set up decoder register 138 as a feedback shift register, generating the same *m*-sequence as encoder register 132, responsive to line $T_1$ to produce its check bits, 0000, during period $D_{11}$. The false state of flip-flop H1 in period $D_{11}$ changes the feedback connections of decoder register 138 (which retains its content of 0000), reverses the shift in received data register 136 such that, through period $D_{19}$, flip-flop $R^{11}$ is again sequentially set up with the data group, causes decoder counter 140 to count down, and causes output flip-flop O1 to follow flip-flop R1. It will be noted that during period $D_4$, the $(G_1G_2'G_3'G_4')$ term of the $_1o_1$ and $_0o_1$ equations was satisfied, but to no effect, since flip-flop H1 was true at that time; however when flip-flop H1 goes false, the $(G_1G_2'G_3'G_4')$ term of these equations is satisfied and thus flip-flop O1 follows flip-flop R1 to thereby emit the message during periods $D_{12-20}$. By period $D_{20}$, decoder counter 140 has reached a count of "0," designated "end-of-message" signal $E_m$, which is also transmitted, by line 170 (FIGURE 1), back to the memory.

Turning now to FIGURE 8, which shows the operation of decoder 114 for the case of a transmission error, it is seen that the bit in error is the first in the data group, indicated by hyphens in the $T_1$ and $T_1'$ columns during period $D_2$, as a change from the correct bit 1 to the incorrect bit 0. Thus, the data group, as received by receiving station 122 and set up in received data register 136, comprises the serial bit train 01111 0111. As before, decoder register 138 sequences, but now generates the decoder check bits 1010 during period $D_{11}$ and as a result of generating its *m'* sequence during period $D_{11-18}$, satisfies, during period $D_{19}$, the $(G_1G_2'G_3'G_4')$ term of the $_1o_1$ and $_0o_1$ equations and thus flip-flop O1 follows the complement of flip-flop R1 at the end of period $D_{19}$, thereby correcting the first bit of the message. It will be noted that the $(G_1G_2'G_3'G_4')$ term of these equations was also satisfied during period $D_4$ but to no effect, since flip-flop H1 was true at that time. As a consequence, the message transmitted to the memory is the correct one.

It should be obvious that, where transmission of numbers having a greater number of digits is to be handled, additional storage in the registers must be provided to preserve the system of the invention. Although the registers have been shown herein in flip-flop form, the recirculating line types presently well known could also be used within the concept of the invention, and these may easily be made to operate sequentially by the logic in this system. Either method of storage could be extended for any number of digits in a binary number to be handled. It should also be obvious that additional bit periods of computer operation may be devoted to the error detection, location and correction system herein described where larger numbers are to be handled.

While the invention has been particularly shown and described with reference to a preferred embodiment thereof, it will be understood by those skilled in the art that various changes in form and details may be made therein without departing from the spirit and scope of the invention.

What is claimed is:

1. An error checking system for transmission of data arranged in variable length words, comprising:

a first store capable of being sequentially set up with signals representing a word;

first means for generating a signal identifying the presence of the word signals in said first store;

a first register responsive to the signal of said first means and to the word signals in said first store to generate a signal unique to the word signals;

a second store responsive to the signal of said first means to be set up with signals representing a data group consisting of the word signals of said first register followed by check signals derived from the unique signal of said first register;

second means for generating a signal identifying the presence of the check signals in said second store;

third means responsive to said first and second means for generating a signal identifying the presence of the date group signals in said second store;

a third store responsive to the signal of said third means to be set up with the data group signals of said second store;

a second register responsive to the signal of said third means and to the data group signals of said second store to generate a check signal; and a fourth store responsive to the data signals of said third store and the check signals of said second register to become set up with the data group signals if the check signal accords with a predetermined value or to become set up with complementary data group signals if the check signal does not accord with the predetermined value.

2. The system of claim 1 in which said fourth store is additionally responsive to the signal generated by said third means.

3. The system of claim 2 in which said first and second registers shift sequentially in response to the word signals and data group signals, respectively.

4. The system of claim 3 in which the sequential shifting of said first and second registers are provided by feedback connections.

5. The system of claim 4 in which the feedback connections of said first and second registers comprise exclusive OR circuits.

6. The system of claim 5 in which the exclusive OR circuits in the feedback connections of said first and second registers provide sequential shifting of said registers in accordance with shift sequences of maximum length.

7. The system of claim 6 in which, during a first part of the system operation, the maximum length shift sequences provided by the exclusive OR feedback connections of said first and second registers are identical.

8. The system of claim 7 in which, during a second part of the system operation, the maximum length shift sequence provided by the exclusive OR feedback connections of said second register is the reciprocal of that provided during the first part.

9. An error checking system for handling of digital data arranged in variable bit length words, comprising:

an input store capable of being sequentially set up with signals representing a word of the data;

first means for generating a signal coincident with the word signals in said input store;

an encoder register responsive to the signal of said first means and to the word signals in said input store selected in accordance with a maximum length shift sequence to generate a signal;

a transmitted data store responsive to the signal of said first means to be set up with signals representing a data group consisting of the word signals in said input store followed by check signals derived from the signal of said encoder register;

second means for generating a signal coincident with the check signal in said transmitted data store;

a set of transmission links responsive to the signals in said transmitted data store and said first and second means;

third means responsive to the signals in said transmission links for generating a signal coincident with the data group signals in said transmission links;

a received data register responsive to the data group signals in said transmission links and to the signal of said third means;

a decoder register responsive to the data group signals in said set of transmission links selected in accordance with a maximum length shift sequence and to the signal of said third means to generate a check signal; and an output store responsive to the data group signals in said received data register and the check signal in said decoder register to become set up with the data group signals if the check signal accords with a predetermined value.

10. The system of claim 9 wherein the maximum length shift sequences in accordance with which said encoder register and said decoder register operate are identical.

11. The system of claim 9 wherein said output store is set up with the complement of the data group signals if the check signal does not accord with a predetermined value.

References Cited by the Examiner

UNITED STATES PATENTS

| | | | |
|---|---|---|---|
| 2,958,727 | 11/1960 | Barbeau et al. ----- | 340—146.1 |
| 2,978,541 | 4/1961 | Steeneck et al. ----- | 340—146.1 |

MALCOLM A. MORRISON, *Primary Examiner.*

M. P. ALLEN, M. J. SPIVAK, *Assistant Examiners.*